United States Patent
Bahmad

(12) United States Patent (10) Patent No.: US 6,553,285 B1
Bahmad (45) Date of Patent: Apr. 22, 2003

(54) MESSAGE CONVEYING SYSTEM FOR MOTOR VEHICLES

(76) Inventor: Reslan Bahmad, 190 Wadsworth Ave., #35, New York, NY (US) 10033

( * ) Notice: Subject to any disclaimer, the term of this patent is extended or adjusted under 35 U.S.C. 154(b) by 22 days.

(21) Appl. No.: 10/028,527

(22) Filed: Oct. 25, 2001

(51) Int. Cl.⁷ ................................................ B60Q 1/50
(52) U.S. Cl. ........................ 701/1; 340/468; 340/475; 340/479; 340/464; 116/42; 40/452
(58) Field of Search .................. 701/1, 2, 36; 340/464, 340/468, 470, 471, 472, 473, 475, 479, 477, 478; 40/446, 447, 448, 452; 116/28 R, 42

(56) References Cited

U.S. PATENT DOCUMENTS

| | | | |
|---|---|---|---|
| 5,053,746 A | * 10/1991 | Taneo | 340/473 |
| 5,132,666 A | * 7/1992 | Fahs | 340/468 |
| 5,426,414 A | * 6/1995 | Flatin et al. | 340/472 |
| 5,500,638 A | * 3/1996 | George | 340/468 |
| 5,574,428 A | * 11/1996 | Groover | 340/468 |
| 5,905,434 A | * 5/1999 | Steffan et al. | 340/464 |

* cited by examiner

*Primary Examiner*—Richard M. Camby
(74) *Attorney, Agent, or Firm*—Goldstein & Lavas, P.C.

(57) ABSTRACT

A message conveying system for motor vehicles that allows a person operating a vehicle to display one of a plurality of messages to other motorists including a message display adapted for positioning within a motor vehicle adjacent to a rear window thereof. The message display includes an alphanumeric screen disposed therein. The message display includes an internal message memory therein for storing a plurality of alphanumeric messages therein. The internal message memory is in communication with the alphanumeric screen. The message display includes an internal message selection control in communication with the internal message memory. A remote control unit is adapted for securement to a dashboard of the motor vehicle. The remote control unit is in communication with the message display. The remote control unit includes a plurality of message buttons. The message buttons each correspond with one of the plurality of alphanumeric messages of the message display whereby pressing one of the message buttons will allow one of the alphanumeric messages to be displayed on the alphanumeric screen.

1 Claim, 5 Drawing Sheets

MESSAGE CONVEYING SYSTEM FOR MOTOR VEHICLES

BACKGROUND OF THE INVENTION

The invention relates to a message conveying system for motor vehicles that allows a person operating a vehicle to display one of a plurality of messages to other motorists.

In today's society, the concept of "road rage" has never been more prevalent. People who drive on our nations roadways are seemingly more on edge than ever. When one motorist does something that angers another motorist, the angered motorist always seems to need to respond in some manner. Usually, this response involves expressing their displeasure to the other motorist in one way or the other. The typical response involves hand gestures or a vocal expression of anger. These responses often require the angered driver to take their eyes off the road while driving, making an accident more likely. What is needed is a way for angered motorists to convey their message to another driver with a reduced risk of causing harm to others.

The present invention attempts to solve the abovementioned problem by providing a message conveying system for motor vehicles that allows a person operating a vehicle to display one of a plurality of messages to other motorists.

SUMMARY OF THE INVENTION

It is an object of the invention to produce a message conveying system for motor vehicles that allows a person operating a vehicle to display one of a plurality of messages to other motorists including a message display adapted for positioning within a motor vehicle adjacent to a rear window thereof.

It is a further object of the invention to provide a message display which allows a driver to quickly and easily select a desired message. Accordingly, several buttons are provided, wherein each button is uniquely associated with a specific message, which scrolls across the display once said button is pressed.

The message display includes a housing having a generally rectangular configuration. The display has a forward face having an alphanumeric screen disposed therein. The message display includes an internal message memory therein for storing a plurality of alphanumeric messages therein. The internal message memory is in communication with the alphanumeric screen. The message display includes an internal message selection control in communication with the internal message memory. The housing has a pair of spaced apart mounting brackets extending downwardly therefrom. A vehicle mount is adapted for securement to the motor vehicle adjacent to the rear window thereof. The vehicle mount includes a lower plate secured to the motor vehicle. The lower plate has a lower cylinder extending upwardly therefrom. The vehicle mount has an upper plate. The upper plate has an upper cylinder extending downwardly therefrom. The upper cylinder is received within the lower cylinder. The upper plate is slidably received between the mounting brackets of the housing of the message display. A remote control unit is adapted for securement to a dashboard of the motor vehicle. The remote control unit is in communication with the message display. The remote control unit includes a plurality of message buttons. The message buttons each uniquely correspond with one of the plurality of alphanumeric messages of the message display whereby pressing one of the message buttons will allow one of the alphanumeric messages to be displayed on the alphanumeric screen, wherein the message scrolls across the screen.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
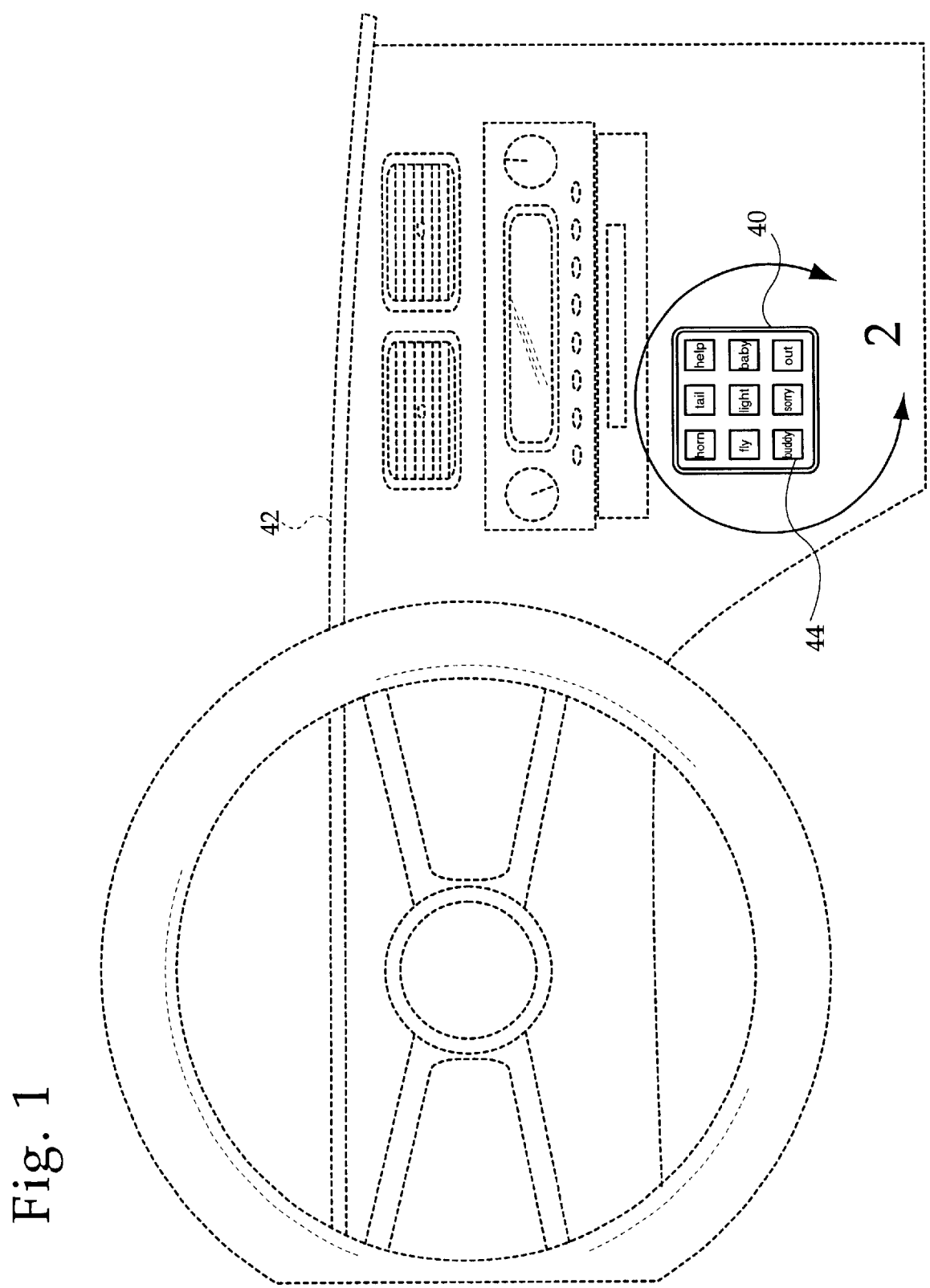
FIG. 1 is a front view of the remote control unit illustrated in place on a dashboard of a motor vehicle.
Figure 2:
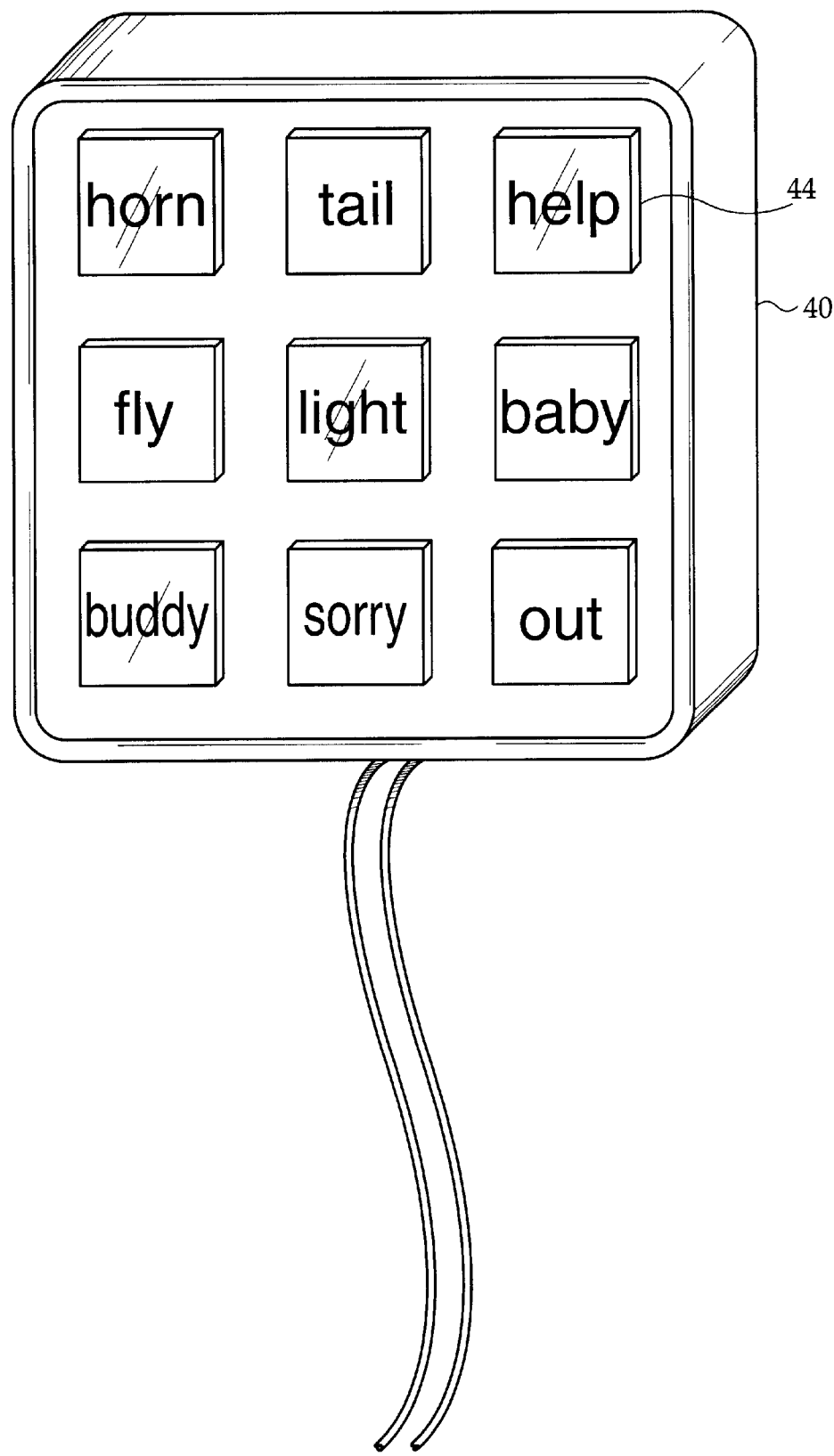
FIG. 2 is a front view of the remote control unit of the present invention.
Figure 3:
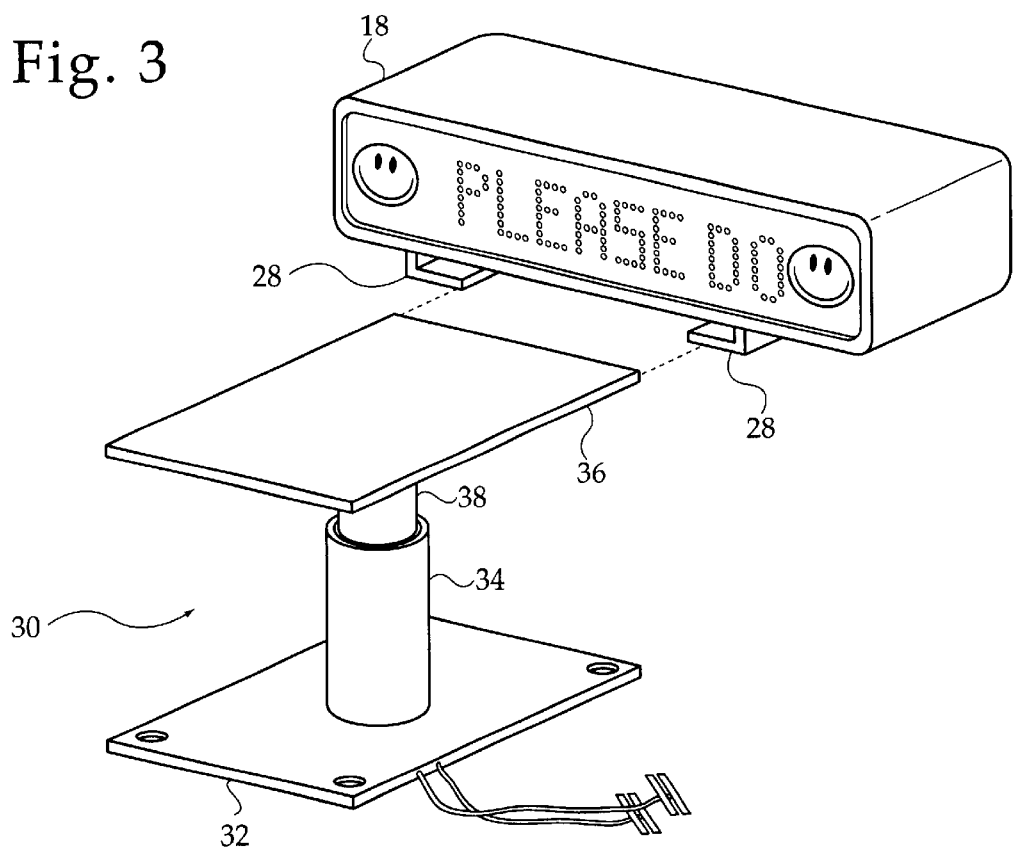
FIG. 3 is a perspective view of the message display and the vehicle mount of the present invention.
Figure 4:
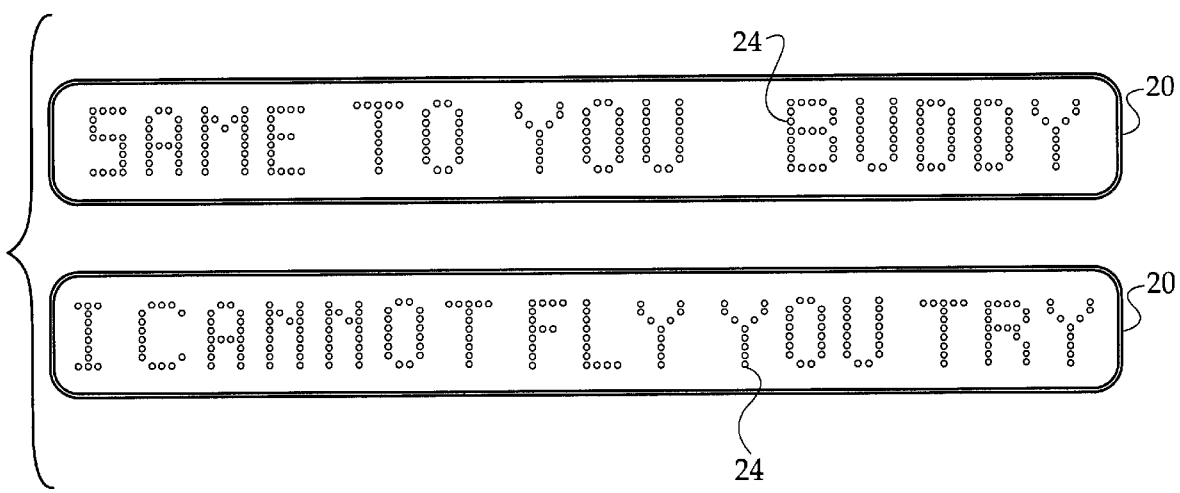
FIG. 4 is a front view of the message display showing examples of the specific messages thereon.
Figure 5:
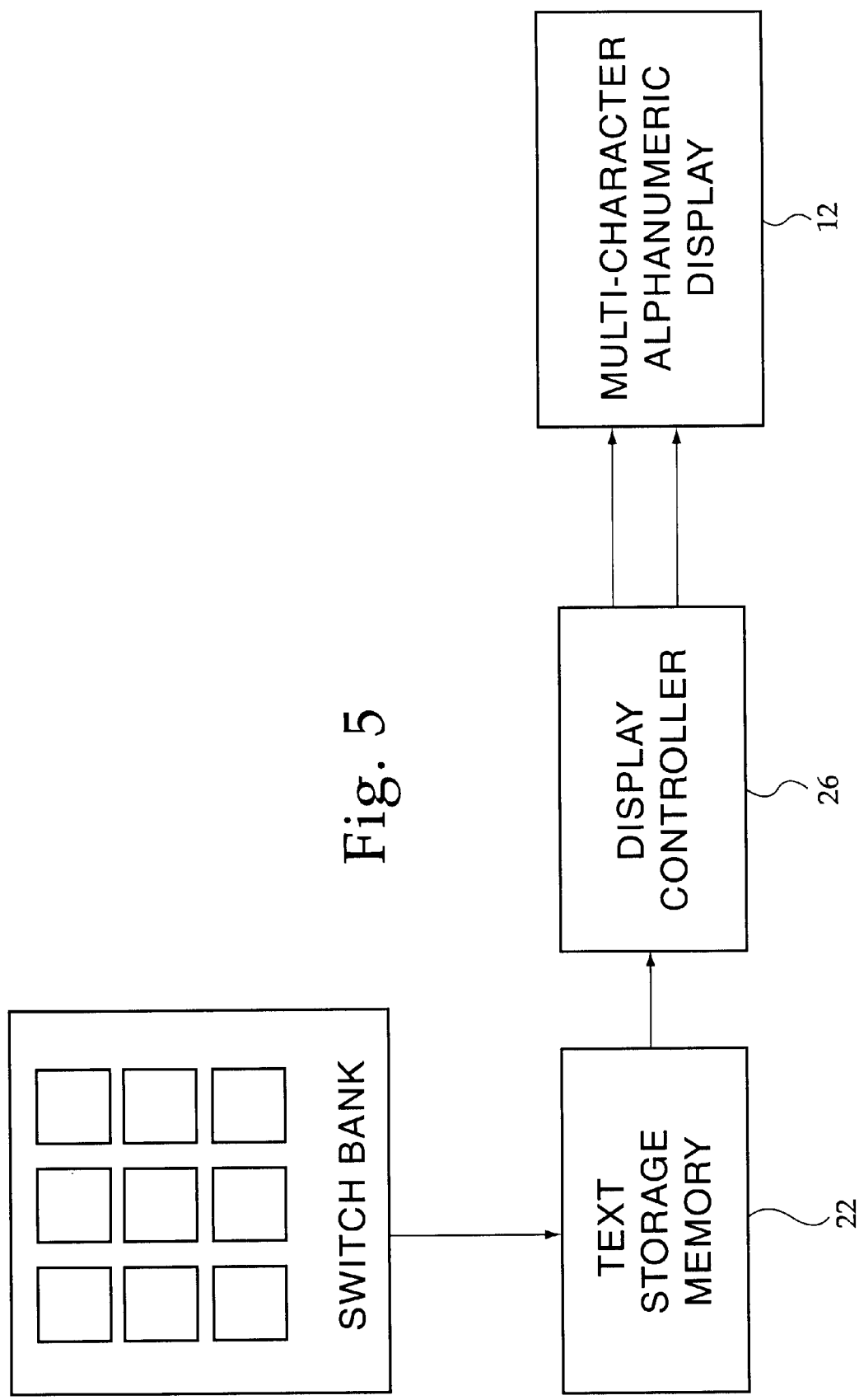
FIG. 5 is a schematic illustration of the operability of the present invention.
Figure 6:
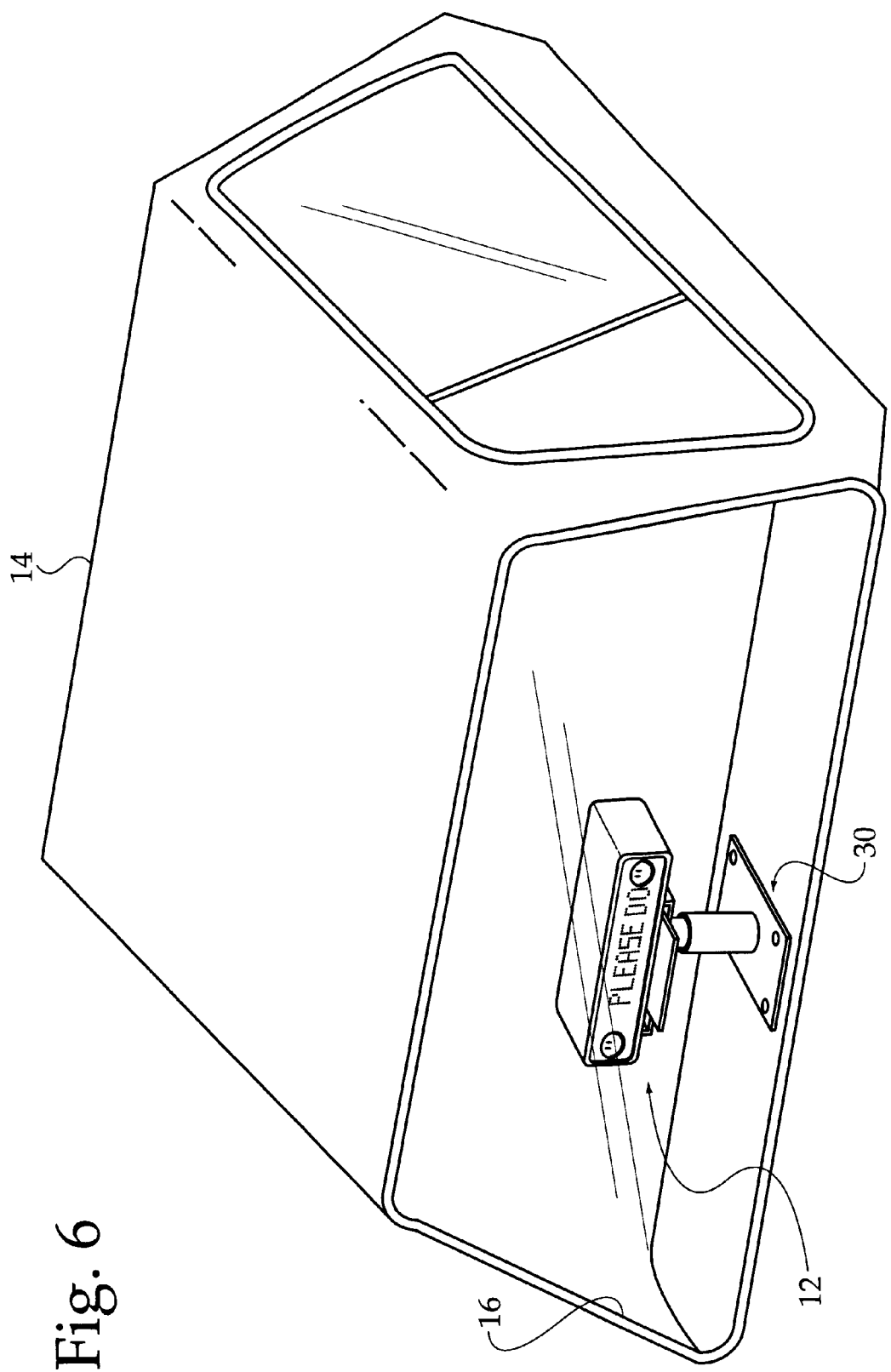
FIG. 6 is a perspective view of the message display illustrated installed in the motor vehicle.

It will be noted in the various figures that the device relates to a message conveying system for motor vehicles that allows a person operating a vehicle to display one of a plurality of messages to other motorists. In its broadest context, the device consists of a message display, a vehicle mount, and a remote control unit. Such components are individually configured and correlated with respect to each other so as to attain the desired objective.

The message display 12 is adapted for positioning within a motor vehicle 14 adjacent to a rear window 16 thereof. The message display 12 includes a housing 18 having a generally rectangular configuration. The housing 18 has a forward face having an alphanumeric screen 20 disposed therein. The message display 12 includes an internal message memory 22 therein for storing a plurality of alphanumeric messages 24 therein. The internal message memory 22 is in communication with the alphanumeric screen 20. The message display 12 includes an internal message selection control 26 in communication with the internal message memory 22. The housing 18 has a pair of spaced apart mounting brackets 28 extending downwardly therefrom. The alphanumeric messages 24 will be capable of being seen at night and during daylight.

The vehicle mount 30 is adapted for securement to the motor vehicle 16 adjacent to the rear window 14 thereof. The vehicle mount 30 includes a lower plate 32 secured to the motor vehicle 16. The lower plate 32 has a lower cylinder 34 extending upwardly therefrom. The vehicle mount 30 has an upper plate 36. The upper plate 36 has an upper cylinder 38 extending downwardly therefrom. The upper cylinder 38 is received within the lower cylinder 34. The upper plate 36 is slidably received between the mounting brackets 28 of the housing 18 of the message display 12.

The remote control unit 40 is adapted for securement to a dashboard 42 of the motor vehicle 16. The remote control unit 40 is in communication with the message display 12. The remote control unit 40 includes a plurality of message buttons 44. The message buttons 44 each uniquely correspond with one of the plurality of alphanumeric messages 24 of the message display 12 whereby pressing one of the message buttons 44 will allow one of the alphanumeric messages 24 to be displayed on the alphanumeric screen 20, wherein said alphanumeric message 24 scolls across the alphanumeric screen 20.

The type of alphanumeric messages 24 can be programmed into the message display 12 according to the needs of the end user. The messages 24 can relate to needed assistance, responses to road rage, messages to other drivers related to future moves of the vehicle, and even sarcastic or joking comments. The message buttons 44 are labelled to allow the motorist to know which button 44 to press given a specific situation. By a preferred embodiment, nine buttons 44 are provided, which each have indicia comprising a single word which corresponds to nine messages. The single word indicia acts as a mnemonic for the driver to call up the entire phrase. The preferred button indicia and corresponding messages are: "Horn", corresponding to "Please Don't Honk . . . Thank You"; "Tail", corresponding to "Do Not Tailgate . . . Thank You"; "Help", corresponding to "I Need Help, Please Call 921"; "Fly", corresponding to "I Cannot Fly—You Try!"; "Light", corresponding to "Lower Your High Beam"; "Baby", corresponding to "Be Aware, Baby On Board"; "Buddy", corresponding to "Same To You, Buddy"; "Sorry", corresponding to "Sorry, This Is Part Of Driving"; and "Out", corresponding to "I Am Pulling Out Soon. Thank You".

In conclusion, herein is presented a message conveying system, which allows a user to call up one and display one of several messages at will. The invention is illustrated by example in the accompanying drawing figures. Such illustrations are exemplative only. Numerous variations are possible, while adhering to the inventive concept. Such variations are considered a part of the present invention.

What is claimed is:

1. A message conveying system for motor vehicles that allows a person operating a vehicle to display one of a plurality of messages to other motorists, comprising, in combination:

a message display adapted for positioning within a motor vehicle adjacent to a rear window thereof, the message display including a housing having a generally rectangular configuration, the display having a forward face having an alphanumeric screen disposed therein, the message display including an internal message memory therein for storing a plurality of alphanumeric messages therein, the internal message memory being in communication with the alphanumeric screen, the message display including an internal message selection control in communication with the internal message memory, the housing having a pair of spaced apart mounting brackets extending downwardly therefrom;

a vehicle mount adapted for securement to the motor vehicle adjacent to the rear window thereof, the vehicle mount including a lower plate secured to the motor vehicle, the lower plate having a lower cylinder extending upwardly therefrom, the vehicle mount having an upper plate, the upper plate having an upper cylinder extending downwardly therefrom, the upper cylinder being received within the lower cylinder, the upper plate being slidably received between the mounting brackets of the housing of the message display; and a remote control unit adapted for securement to a dashboard of the motor vehicle, the remote control unit being in communication with the message display, the remote control unit including a plurality of message buttons, each of the message buttons uniquely corresponding with one of the plurality of alphanumeric messages of the message display whereby pressing one of the message buttons will allow one of the alphanumeric messages to be displayed on the alphanumeric screen.

\* \* \* \* \*